May 27, 1952     E. A. VAN YZEREN     2,598,467
COMPENSATING MEANS FOR VARIABLE INDUCTANCES
HAVING MAGNETIC CORES
Original Filed March 17, 1943

INVENTOR.
EWOUD ADRIAAN VAN YZEREN
BY

ATTORNEY.

Patented May 27, 1952

2,598,467

UNITED STATES PATENT OFFICE 2,598,467

COMPENSATING MEANS FOR VARIABLE INDUCTANCES HAVING MAGNETIC CORES

Ewoud Adriaan van Yzeren, Eindhoven, Netherlands, assignor to Hartford National Bank and Trust Company, Hartford, Conn., as trustee Continuation of application Serial No. 479,466, March 17, 1943. This application December 20, 1950, Serial No. 213,431. In the Netherlands November 9, 1940

Section 1, Public Law 690, August 8, 1946
Patent expires November 9, 1960

3 Claims. (Cl. 336—77)

This application is a continuation of application Serial No. 479,466, filed March 17th, 1943 by Ewoud Adriaan van Yzeren, now abandoned.

The invention relates to inductance coils whose inductance can be adjusted by means of a core of magnetic material which is slidable in the field of the coil and in the axial direction thereof, said coils being referred to hereinafter as "slidable-core coils."

Such coils may be utilized inter alia in radio-receiving sets wherein, jointly with a fixed capacity, they form a tunable oscillatory circuit.

Just as ganged tuning condensers such as are utilized in a so-called "straight set," have to comply with the requirement that the capacities of all sections should have the same course, there arises, if slide-core coils are utilized in such a receiver, the requirement that the course of the inductance of the coils as a function of the displacement should be mutually equal.

With slide-core coils suitable for use in receivers according to the superheterodyne principle the course of the inductance of the slide-core coil of the oscillatory circuit must be such that over the whole of the wave-range the frequency of the oscillatory circuit exhibits a constant difference with respect to the frequency of the preceding circuits.

In the mass production of slidable core coils, it is generally impossible to obtain the desired accuracy of adjustment during the manufacture of such coils. I have found that it is more practicable to provide an adjustable compensating means for the coil so that the inductance of the coil can have a predetermined range of values which can be selected after the manufacture of the coil.

In practice it has been found that for slide-core coils destined for oscillatory circuits with the same tuning, such as the oscillatory circuits of a "straight set," or the high-frequency circuits of a superheterodyne receiver, it is sufficient that adjustment of the initial (or final) inductance is possible independently of one another.

In order to obtain in superheterodyne receivers the desired frequency difference with the preceding circuits, the slide-core coil may be so constructed that at the beginning and at the end of the tuning range the frequency difference acquires the correct value. It has been found, however, that in the middle of the range there occur inadmissibly high divergences which may amount to from 60 to 70 kilocycles per second.

The invention has for its object to provide means of compensating the above-mentioned divergence after the manufacture of the coils.

According to the invention, in the neighborhood of one end or of both ends of the coil there is arranged a body of conductive material which, when the core is completely slid out of the coil, is loosely coupled with the latter.

The body may be, for example, of annular shape and the distance between this body and the end of the coil should preferably be adjustable.

The invention will be explained more fully with reference to the accompanying drawing wherein.

Figure 1:
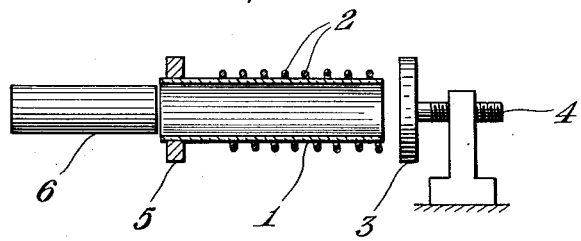
Figure 1 illustrates a variable inductance element of the sliding core type which is provided with adjustable non-magnetic members for adjusting the maximum and minimum values of the inductance.

Referring to Fig. 1 there is shown at 2 a coil having its turns wound around a cylindrical coil form or body 1. In the neighborhood of the right-hand end of the coil is arranged a disc-shaped body 3 of conductive, non-magnetic material, for example of copper. The distance of the disc 3 with respect to the end of the coil is adjustable by means of a screw 4.

The other end of the coil is surrounded by an annular body 5 likewise of conductive, non-magnetic material and the distance of this body with respect to the coil end proper is adjustable, for example, owing to the fact that screw-threads are cut into the ring and on the coil body. The slidable core of magnetic material is denoted by 6.

In the shown position of the core the inductance of the coil has the minimum value; if the inductance is too high the ring 5 is displaced to the right; if the inductance is too low the ring has to be displaced to the left. It is thus possible to adjust the minimum value of the inductance.

The maximum value of the inductance of the coil is obtained by causing the core to slide completely to the right so that the whole of the core is within the coil. If this value is not completely exact, subsequent adjustment thereof may take place in a manner similar to that in which the minimum inductance is adjusted by displacing the disc 3. Now a slight correction of the position of the ring 5 will in general be necessary anew since the position of the disc 3 may perhaps slightly influence the minimum inductance. Since, however, when the whole of the core has slid out of the coil, the disc 3 and the ring 5 are each coupled with only a small portion of the coil, the required extra-correction is only slight so that in this way an adjustment both of the minimum and of the maximum values of the inductance can easily be realized.

If circumstances allow it, one of the bodies 5 or 3 may be dispensed with, in which event correction is possible at only one point. It is obvious that for the adjustment of the bodies 3 and 5 other constructions are also possible.

Figure 2:
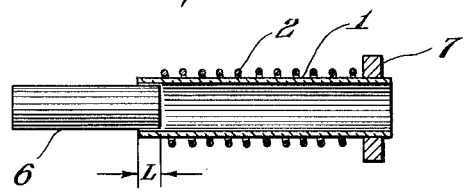
Figure 2 illustrates a variable inductance element for a superheterodyne receiver which is of the sliding core type and is provided with an adjustable non-magnetic member to improve the tracking in the receiver.
Figure 3:
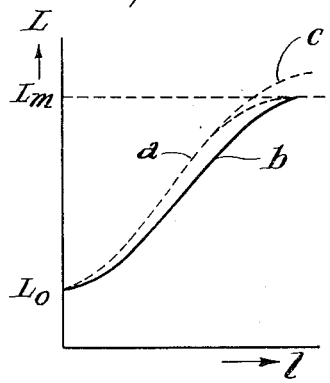
Figure 3 shows curves illustrating the improved tracking relationship in a superheterodyne receiver obtainable with the use of inductance elements according to the invention.
Figure 4:
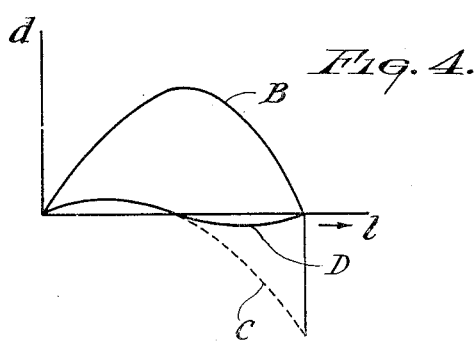
Figure 4 shows padding curves for a superheterodyne receiver.

With reference to Figs. 2, 3 and 4 it will now be explained in detail in what manner a slide-core coil according to the invention can be adjusted for the case wherein such a coil is utilized in the oscillator circuit of a superheterodyne receiver, in which event the oscillator circuit must consequently have a constant frequency difference wtih respect to the preceding circuits of the apparatus.

In Fig. 3, curve $a$ indicates the desired course of the inductance L as a function of the length $l$ of the core portion which is within the coil. If this coil is joined with a given condenser to form an oscillatory circuit which is utilized as a frequency-determining oscillatory circuit in the local oscillator of a superheterodyne apparatus, the frequency difference of this oscillatory circuit with respect to the high-frequency circuits preceding the frequency changer of the apparatus is consequently always constant.

It would be possible to attempt to approximate the course of the inductance according to curve $a$ in Fig. 3 by utilizing the slide-core coil shown in Fig. 2, which is constituted by a cylindrical coil body 1 on which turns 2 are provided and by a slide-core 6 which may be caused to slide from the left into the coil. By suitably dimensioning the coil it may be ensured that at the beginning and at the end of the tuning range the inductance has the correct value. It is thus possible to realize a course of the inductance as is indicated by a curve $b$ in Fig. 3. This curve shows that in the middle of the tuning range there occurs a considerable divergence from the prescribed course determined by curve $a$. The frequency difference between the oscillator circuit and the preceding circuit or circuits consequently differs in the middle of the tuning range considerably from the desired value. In Fig. 4 the so-called padding curve, i. e. the divergence $d$ as a function of the length $l$ of that portion of the core which is within the coil, is represented by the curve B.

If now, for example, owing to the use of an iron core having a higher permeability, the maximum inductance is increased, which step does not influence, however, the minimum inductance, the inductance has a course as is shown by the curve $c$ in Fig. 3, with which there occurs a divergence $d$ from the prescribed frequency difference according to the curve C. The curves $c$ and C in Figs. 3 and 4 respectively exhibit at the beginning and in the middle of the range the desired course; at the end of the range, however, the inductance is too high with the result that there an appreciable divergence $d$ from the desired constant frequency difference is still perceptible.

If now a ring 3 of copper is provided in the manner shown in Fig. 2, which ring reduces the maximum inductance of the coil to the value prescribed by the curve $a$, we obtain a padding curve D which exhibits in the whole of the tuning range only slight divergence $d$.

It will be clear that other shapes of the inductance curve may be obtained with which the measure in which the slopes of the curves are different, may be influenced by the degree of coupling between the ring 3 and the coil 2; also the course of the middle portion of the curve may be influenced by utilizing a ring at each end of the coil.

Furthermore, it is possible, for example, in superheterodyne receivers, to provide each of the slide-core coils of the preceding circuits also with adjustable conductive rings in order to adjust exactly the initial and final values of the inductance, so that the desired equality in the course is obtained.

What I claim is:

1. An adjustable inductance tuning unit comprising a coil, a core of magnetic material movable into and out of said coil in an axial direction to vary the inductance thereof between maximum and minimum values, a conductive non-magnetic member for and spaced beyond each end of said coil in axial alignment therewith for determining the maximum and minimum inductance values, respectively, of said unit, and adjustable means to space each of said conductive non-magnetic members with respect to the ends of said coil to adjust said maximum and minimum inductance values of said unit.

2. An adjustable inductance tuning unit comprising a coil, a core of magnetic material movable into and out of said coil in an axial direction to vary the inductance thereof between maximum and minimum values, an annular conductive non-magnetic member for and spaced from each end of said coil in axial alignment therewith for determining the maximum and minimum inductance values, respectively, of said unit, and adjustable means to space each of said conductive non-magnetic members with respect to the ends of said coil to adjust the maximum and minimum inductance values of said unit.

3. An adjustable inductance tuning unit comprising a coil, a core of magnetic material movable into and out of said coil in an axial direction to vary the inductance thereof between maximum and minimum values, an annular conductive non-magnetic member for and spaced from that end of said coil into which said core enters and axially aligned therewith for adjusting the minimum inductance value of said unit, a second conductive non-magnetic member for and spaced from the end of said coil remote from that end into which said core enters for adjusting the maximum inductance value of said unit, and adjustable means to space each of said conductive non-magnetic members with respect to the ends of said coil to adjust the maximum and minimum inductance values of said unit.

EWOUD ADRIAAN VAN YZEREN.

REFERENCES CITED

The following references are of record in the file of this patent:

UNITED STATES PATENTS

| Number | Name | Date |
| --- | --- | --- |
| 2,222,387 | Wheeler et al. | Nov. 19, 1940 |